(12) United States Patent
Harrison

(10) Patent No.: US 7,283,043 B1
(45) Date of Patent: Oct. 16, 2007

(54) KEVIN SYSTEM

(76) Inventor: Kevin Harrison, 2260 Crotona Ave. #2E, Bronx, NY (US) 10457

( * ) Notice: Subject to any disclaimer, the term of this patent is extended or adjusted under 35 U.S.C. 154(b) by 240 days.

(21) Appl. No.: 11/136,689

(22) Filed: May 23, 2005

Related U.S. Application Data

(60) Provisional application No. 60/598,412, filed on Aug. 4, 2004.

(51) Int. Cl.
*B60Q 1/00* (2006.01)
(52) U.S. Cl. .................... 340/457.1; 340/468; 180/273
(58) Field of Classification Search ............ 340/457.1, 340/457, 425.5, 479, 468; 362/487, 503; 180/273
See application file for complete search history.

(56) References Cited

U.S. PATENT DOCUMENTS

| | | | | |
|---|---|---|---|---|
| 4,849,733 A * | 7/1989 | Conigliaro et al. | ...... | 340/457.1 |
| 5,714,930 A * | 2/1998 | McKinney, Jr. | ............. | 340/468 |
| 6,059,066 A | 5/2000 | Larry | .......................... | 180/268 |
| 6,215,395 B1 | 4/2001 | Slaughter | ................. | 340/457.1 |
| 6,239,695 B1 * | 5/2001 | Okada et al. | ............ | 340/457.1 |
| 6,501,374 B1 * | 12/2002 | King et al. | ............. | 340/457.1 |
| 6,545,597 B1 * | 4/2003 | Blount | .................... | 340/425.5 |
| 6,774,781 B1 * | 8/2004 | Lee | ............................ | 340/468 |
| 7,154,386 B2 * | 12/2006 | Amemiya | ................ | 340/457.1 |

\* cited by examiner

*Primary Examiner*—Phung T. Nguyen

(57) ABSTRACT

A safety system for use in combination with vehicles. The safety system comprises two halogen lights, one mounted within the vehicle near the front windshield and the other mounted within the vehicle near the rear windshield. Both of the halogen lights will go on if any individual within the vehicle is not wearing their seat belt, thereby providing a safety warning system for authorities and an encouragement for the general public to always wear seat belts when the vehicle is moving.

3 Claims, 2 Drawing Sheets

KEVIN SYSTEM

I. CROSS-REFERENCE TO RELATED APPLICATIONS

This application claims the benefit of U.S. Provisional Application No. 60/598,412 filed Aug. 4, 2004.

II. BACKGROUND OF THE INVENTION

The present invention concerns that of a safety apparatus for use in combination with vehicles.

III. DESCRIPTION OF THE PRIOR ART

U.S. Pat. No. 6,215,395, issued to Slaughter, discloses a vehicle having a visible display to show the status of the seat belts, and includes external viewing by other motorists or law enforcement personnel.

U.S. Pat. No. 6,059,066, issued to Larry and U.S. Pat. No. 5,714,930, issued to McKinney Jr., disclose additional seat belt indicator means for observation of a viewer located outside the vehicle.

IV. SUMMARY OF THE INVENTION

The present invention concerns that of a safety system for use in combination with vehicles. The safety system comprises two halogen lights, one mounted within the vehicle near the front windshield and the other mounted within the vehicle near the rear windshield. Both of the halogen lights will go on if any individual within the vehicle is not wearing their seat belt, thereby providing a safety warning system for authorities and an encouragement for the general public to always wear seat belts when the vehicle is moving.

There has thus been outlined, rather broadly, the more important features of a seat belt safety system that the detailed description thereof that follows may be better understood and in order that the present contribution to the art may be better appreciated. There are, of course, additional features of the seat belt safety system that will be described hereinafter and which will form the subject matter of the claims appended hereto.

In this respect, before explaining at least one embodiment of the seat belt safety system in detail, it is to be understood that the seat belt safety system is not limited in its application to the details of construction and to the arrangements of the components set forth in the following description or illustrated in the drawings. The seat belt safety system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present seat belt safety system. It is important, therefore, that the claims be regarded as including such equivalent constructions insofar as they do not depart from the spirit and scope of the present invention.

It is therefore an object of the present invention to provide a seat belt safety system which has all of the advantages of the prior art and none of the disadvantages.

It is another object of the present invention to provide a seat belt safety system which may be easily and efficiently manufactured and marketed.

It is another object of the present invention to provide a seat belt safety system which is of durable and reliable construction.

It is yet another object of the present invention to provide a seat belt safety system which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
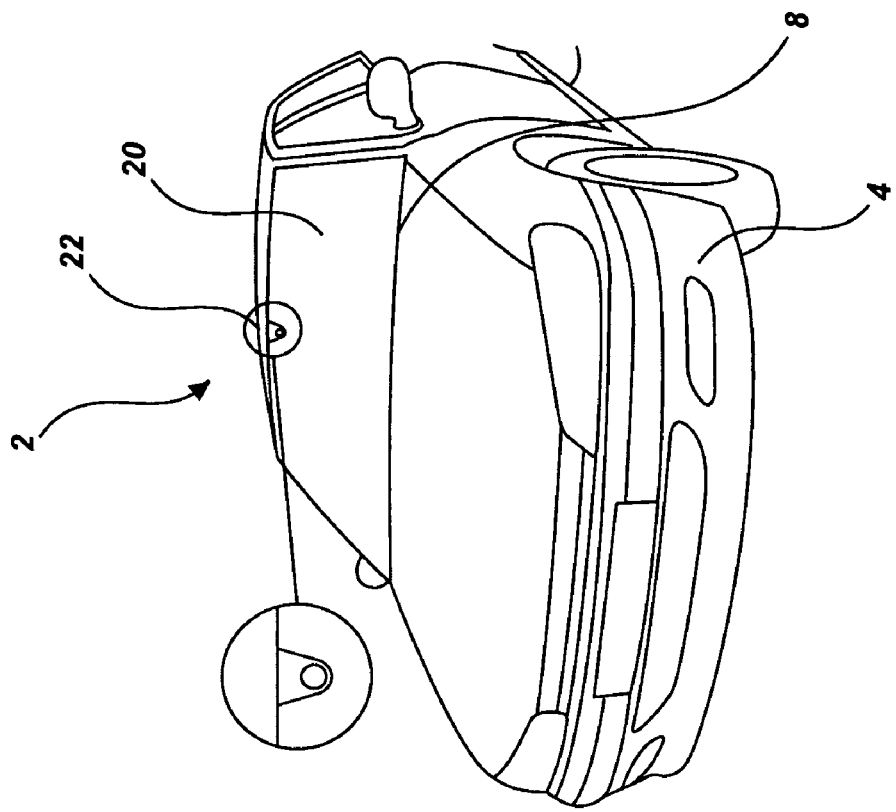
FIG. 1 shows a rear perspective view of an vehicle with the safety system integrated into it.
Figure 2:
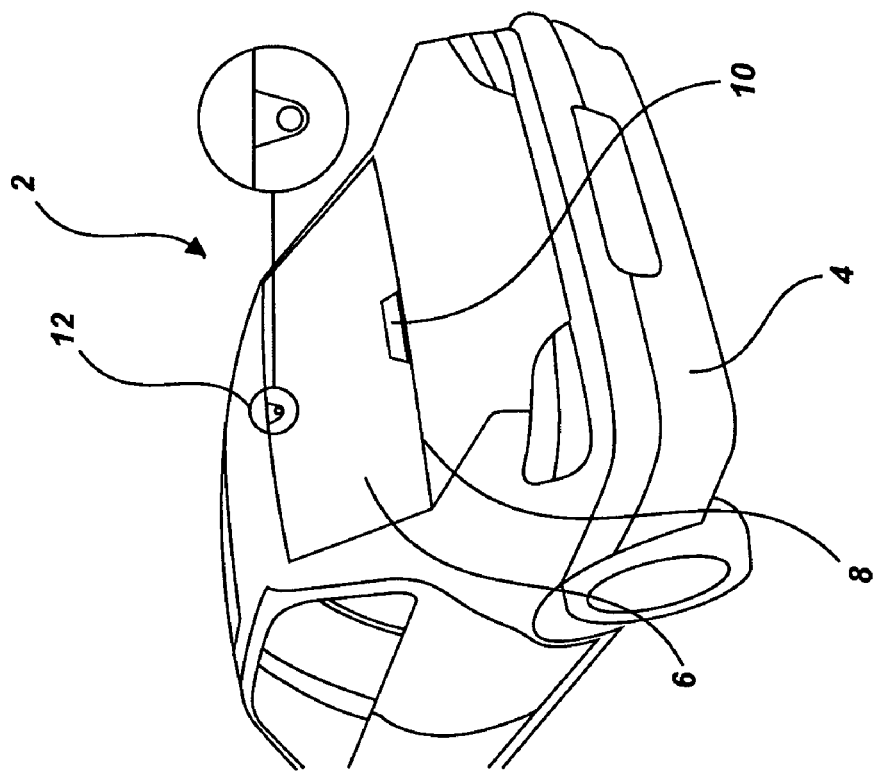
FIG. 2 shows a rear perspective view of an vehicle with the safety system integrated into it.

FIG. 1 shows a rear perspective view of an vehicle 4 with the safety system 2 integrated into it, while FIG. 2 shows a rear perspective view of an vehicle 4 with the safety system 2 integrated into it.

The vehicle 4, in FIG. 1, can be seen with a rear windshield 6. The rear windshield 6 has two ends, a left end and a right end, and also has two side surfaces, a top side surface and a bottom side surface. The rear windshield 6 is connected to the frame 8 of the vehicle 4 through attachment of both ends and both side surfaces.

Within vehicle 4 is located a windshield brake light 10, which is mounted within the vehicle 4 immediately next to the rear windshield 6 near the bottom side surface of the rear windshield 6. Windshield brake light 10 is designed to turn on whenever a brake pedal is depressed within the vehicle.

A part of the safety system 2 can be seen in FIG. 1 also. Halogen light 12 is mounted within the vehicle 4 immediately next to the rear windshield 6 near the top side surface of the rear windshield 6. Halogen light 12 can be one of a wide variety of colors, but preferably is blue to help distinguish it from the windshield brake light 10. Halogen light 12 is designed to turn to an "on" position when any individual within the vehicle 4 does not have their seat belt fastened. Halogen light 12 will be in an "off" position when all passengers within the vehicle 4 have their seat belts fastened.

The vehicle 4, in FIG. 2, can be seen with a front windshield 20. The front windshield 20 has two ends, a left end and a right end, and also has two side surfaces, a top side surface and a bottom side surface. The front windshield 20 is connected to the frame 8 of the vehicle 4 through attachment of both ends and both side surfaces.

A part of the safety system 2 can be seen in FIG. 1 also. Halogen light 22 is mounted within the vehicle 4 immediately next to the front windshield 20 near the top side surface of the front windshield 20. Halogen light 22 can be one of a wide variety of colors, but preferably is blue to help distinguish it from other lighting sources, such as rear windshield 6, which is attached to the rear windshield 6.

Halogen light 22, just light halogen light 12, is designed to turn to an "on" position when any individual within the vehicle 4 does not have their seat belt fastened. Halogen light 22 will be in an "off" position when all passengers within the vehicle 4 have their seat belts fastened.

Figure 3:
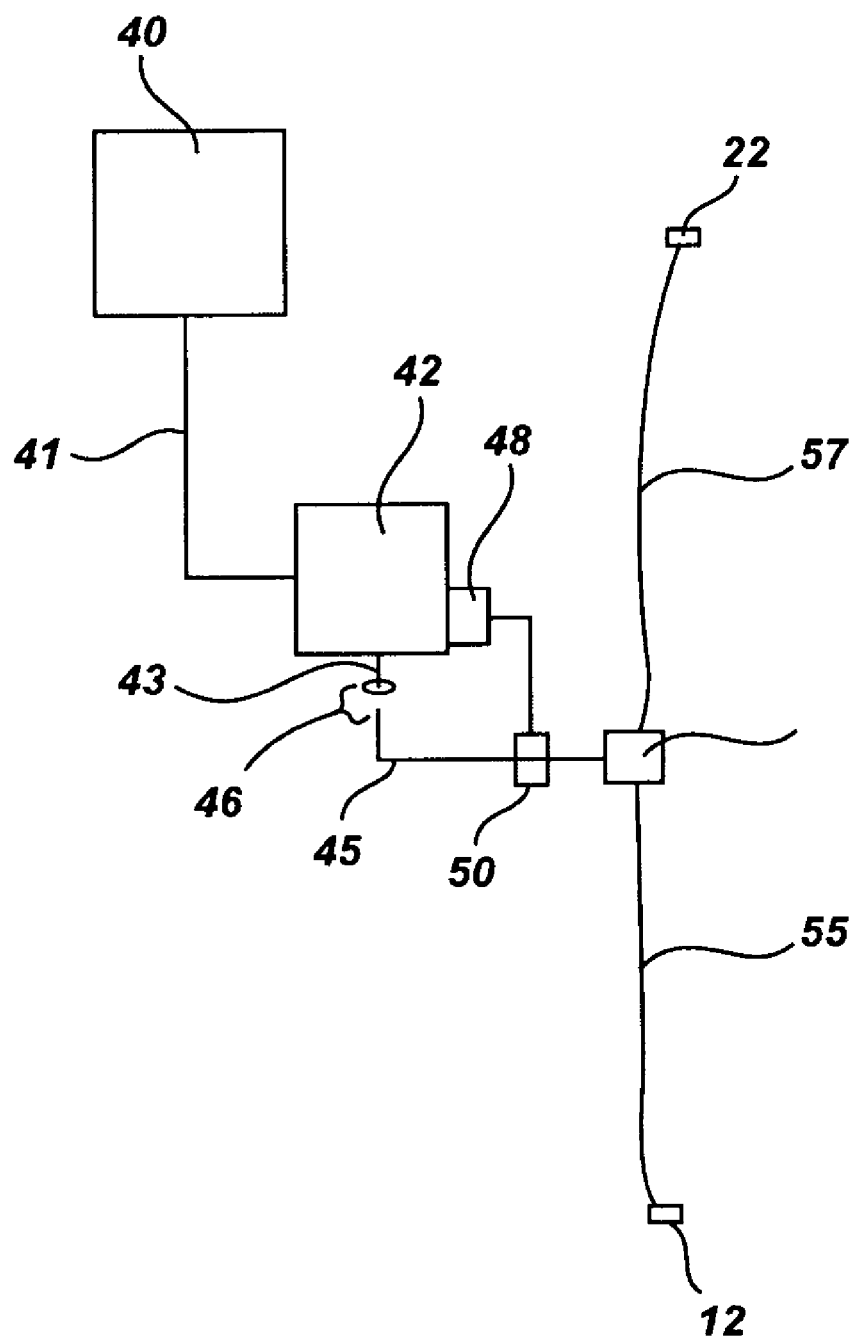
FIG. 3 shows a schematic of the safety system as it would be incorporated into the vehicle.

FIG. 3 shows a schematic of the safety system 2 as it would be incorporated into the vehicle. FIG. 3 shows only the connectivity between one seat 42 within the vehicle, but is applicability is equally expandable to all the seating positions within the vehicle.

Power means 40, which is preferably the vehicle battery, is connected via connection 41 to sensor 43 under seat 42. When seat 42 is not being used, a small gap 46 exists in between the sensor 43 and connection 45. However, when seat 42 is being used by an individual, the individual's weight will push down on the sensor 46, causing it to make contact with connection 45, which is connected through circuit 50 to central connector 44. Central connector 44 is connected by a pair of connectors 55 and 57, respectively, to halogen lights 12 and 22.

Seat belt latch 48 is connected via connector 65 to circuit 50, which normally remains in a closed position. If an individual sits down in the seat 42 and does not put on their seat belt, a continuous connection will exist in between the power means 40 and the halogen lights 12 and 22, causing them to turn to an "on" position and alert authorities that seat belts are not being worn.

Seat belt latch 48 is connected via connector 65 to circuit 50, which normally remains in a closed position. If an individual sits down in the seat 42 and puts on their seat belt, seat belt latch 48 will cause circuit 50 to open, thereby breaking the continuous connection that exists in between the power means 40 and the halogen lights 12 and 22 once an individual sits down in seat 42.

By placing this system under each seat 42 within a vehicle, each individual must placed on their seat belt, lest the halogen lights 12 and 22 be placed in an "on" position, which could potentially be seen by authorities. The mere fear of having these halogen lights 12 and 22 on and being pulled over is more than enough to cause all individuals within a vehicle 4 to put their seat belts on when the vehicle 4 is moving.

What I claim as my invention is:

1. A safety system for use in a vehicle in combination with a vehicle, the safety system comprising:
   a vehicle frame,
   a plurality of seats within the vehicle, each seat including a safety belt,
   a rear windshield attached to the vehicle frame, the rear windshield having a left end, a right end, a top side surface, and a bottom side surface,
   a windshield brake light mounted within the vehicle immediately next to the rear windshield near one of the side surfaces of the rear windshield,
   a first halogen light mounted within the vehicle immediately next to the rear windshield near one of the side surfaces of the rear windshield, the first halogen light mounted near the side surface of the rear windshield spaced opposite the windshield brake iight,
   a front windshield attached to the vehicle frame, the front windshield having a left end, a right end, a top side surface, and a bottom side surface,
   a second halogen light mounted within the vehicle immediately next to the front windshield near the top side surface of the front windshield, and
   means for turning on each of the halogen lights if an individual is sitting on any one of the seats and has not fastened their seat belt for that seat.

2. A safety system for use in a vehicle in combination with a vehicle according to claim 1 wherein the means for turning on each of the halogen lights if an individual is sitting on any one of the seats and has not fastened their seat belt for that seat further comprises:
   a sensor array located under each seat within the vehicle, the sensor array being attached to each of the halogen lights within the vehicle,
   power means connected to the sensor array,
   wherein the sensor array under each particular seat is in a closed position if the seat is occupied and the seat belt for that particular seat is not fastened, causing each of the halogen lights to turn on, and
   further wherein the sensor array under each particular seat is in an open position if the seat is occupied and the seat belt for that particular seat is fastened, causing each of the halogen lights to turn off.

3. A safety system for use in a vehicle in combination with a vehicle according to claim 1 wherein the means for turning on each of the halogen lights has a central connector connecting each of the seats to the halogen lights.

* * * * *